United States Patent [19]

Kondoh

[11] Patent Number: 4,609,026
[45] Date of Patent: Sep. 2, 1986

[54] AUTOMATIC SIPE FORMING MACHINE

[75] Inventor: Kazuaki Kondoh, Kobe, Japan

[73] Assignee: Sumitomo Rubber Industries, Ltd., Hyogo, Japan

[21] Appl. No.: 589,414

[22] Filed: Mar. 14, 1984

[30] Foreign Application Priority Data

Mar. 18, 1983 [JP] Japan ................................. 58-46556

[51] Int. Cl.$^4$ ........................................... B29H 21/08
[52] U.S. Cl. .................... 157/13; 51/DIG. 33
[58] Field of Search .................. 157/13; 51/DIG. 33

[56] References Cited

U.S. PATENT DOCUMENTS

| | | | |
|---|---|---|---|
| 3,384,146 | 5/1968 | Sommer | 157/13 |
| 3,910,337 | 10/1975 | Pelletier | 157/13 |
| 4,080,230 | 3/1978 | Batchelor et al. | 157/13 X |

Primary Examiner—James G. Smith
Attorney, Agent, or Firm—Birch, Stewart, Kolasch & Birch

[57] ABSTRACT

An automatic sipe forming machine for forming sipes on a tread face of a tire, including a tire supporting apparatus and a sipe forming apparatus. The tire supporting apparatus further includes a tire bearing mechanism and an intermittent rotary mechanism for intermittently rotating the tire. The sipe forming apparatus further includes at least one disc cutter, a sliding beam, a cutter holder, a carriage for reciprocatingly guiding the cutter holder, and a guide member for reciprocatingly guiding the carriage. The sipe forming apparatus can further include an angle changing mechanism for changing a sipe forming angle of the disc cutter.

12 Claims, 7 Drawing Figures

AUTOMATIC SIPE FORMING MACHINE

BACKGROUND OF THE INVENTION

The present invention generally relates to an automatic sipe forming machine for forming sipes (or sipings or fine or microscopic cuts) on a circumferential tread face of a new tire or a retreaded tire for the purpose of improving its resistance to skid.

Conventionally, in sipe forming methods, it has been arranged that an operator manually forms grooves on a tread face to a predetermined depth by the use of a knife while placing a scale on the tread face. However, the known sipe forming methods are undesirable due to their entire manual operations that require several hours for forming sipes on one whole tread face and the operation itself is dangerous, while non-uniformities or irregularities of pitch, depths, angles and shapes of the sipes are likely to occur.

Meanwhile, in order to automate sipe forming operations of this kind, a sipe forming machine is disclosed in, for example, Japanese Patent Publication No. 37947/1976 (Tokkosho No. 51-37947). However, this prior art sipe forming machine has such inconveniences that the machine is complicated in structure and high in production cost, while it is not easy to change pitches, angles, depths, etc. of the sipe.

In order to solve the above described problems, there was proposed in Japanese Patent Publication No. 5660/1981 (Tokkosho No. 56-5660) an automatic sipe forming machine which is simple in structure and low in manufacturing cost and in which it is easy to adjust or change pitches, angles, depths and shapes of the sipes. The known automatic sipe forming machine generally comprises a sipe forming apparatus and a feed apparatus. The sipe forming apparatus further comprises a cutter mechanism including at least one disc cutter rotated by a motor, a crank mechanism for reciprocating the cutter mechanism in a sipe forming direction, and an eccentric cam mechanism for reciprocating, in response to the reciprocation of the cutter mechanism in the sipe forming direction, the cutter mechanism in a vertical direction orthogonal to the sipe forming direction. Meanwhile, the feed apparatus further comprises a feed mechanism for intermittently feeding onto a table, in response to the sipe forming movement of the cutter mechanism, a material to be subjected to sipe forming, a vertical feed mechanism for moving the table vertically, and a pivotal mechanism for pivoting the table. However, the known automatic sipe forming machine is designed to form sipes on the flat surface of a sheet-like precured tread for a retreaded tire. Consequently, this known automatic sipe forming machine is undesirable in that the machine is not capable of directly forming sipes on a circumferential tread face of a new tire or a retreaded tire.

SUMMARY OF THE INVENTION

Accordingly, an essential object of the present invention is to provide an improved automatic sipe forming machine for directly forming sipes on a circumferential tread face of a new tire or a retreaded tire, which is simple in structure and low in manufacturing cost and wherein it is possible to readily adjust or change the pitch, angles, depths and shapes of the sipes with ease, with substantial elimination of the disadvantages inherent in conventional sipe forming methods and conventional sipe forming machines.

In accomplishing these and other objects according to one preferred embodiment of the present invention, there is provided an improved automatic sipe forming machine for forming sipes on a tread face of a tire, comprising a tire supporting apparatus and a sipe forming apparatus. The tire supporting apparatus comprises: a tire bearing mechanism including a pair of first and second rims; the tire being rotatably and vertically supported by the first and second rims; and an intermittent rotary mechanism for intermittently rotating the tire at intervals of a predetermined angle. The said sipe forming apparatus comprises: at least one disc cutter for forming the sipes on the tread face of the tire, which is rotated by a motor, a sliding beam which is arranged to follow the curvature of the tread face of the tire so as to regulate the depth of the sipes to be formed by the disc cutter; a cutter holder for supporting the disc cutter and said sliding beam; a carriage for reciprocatingly guiding the cutter holder in a sipe forming direction (leftwards and rightwards); a guide member for reciprocatingly guiding the carriage in forward and rearward directions orthogonal to the sipe forming direction; and an angle changing mechanism which is arranged to adjustably secure the guide member at an appropriate angle so as to change the sipe forming angle of the disc cutter.

In accordance with the present invention, it becomes possible to directly form the sipes on the circumferential tread face of the new tire or the retreaded tire.

Furthermore, in accordance with the present invention, it is possible to adjust the pitches, angles, depths and shapes of the sipes with much ease.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout the several views of the accompanying drawings.

DETAILED DESCRIPTION OF THE INVENTION

Figure 1:
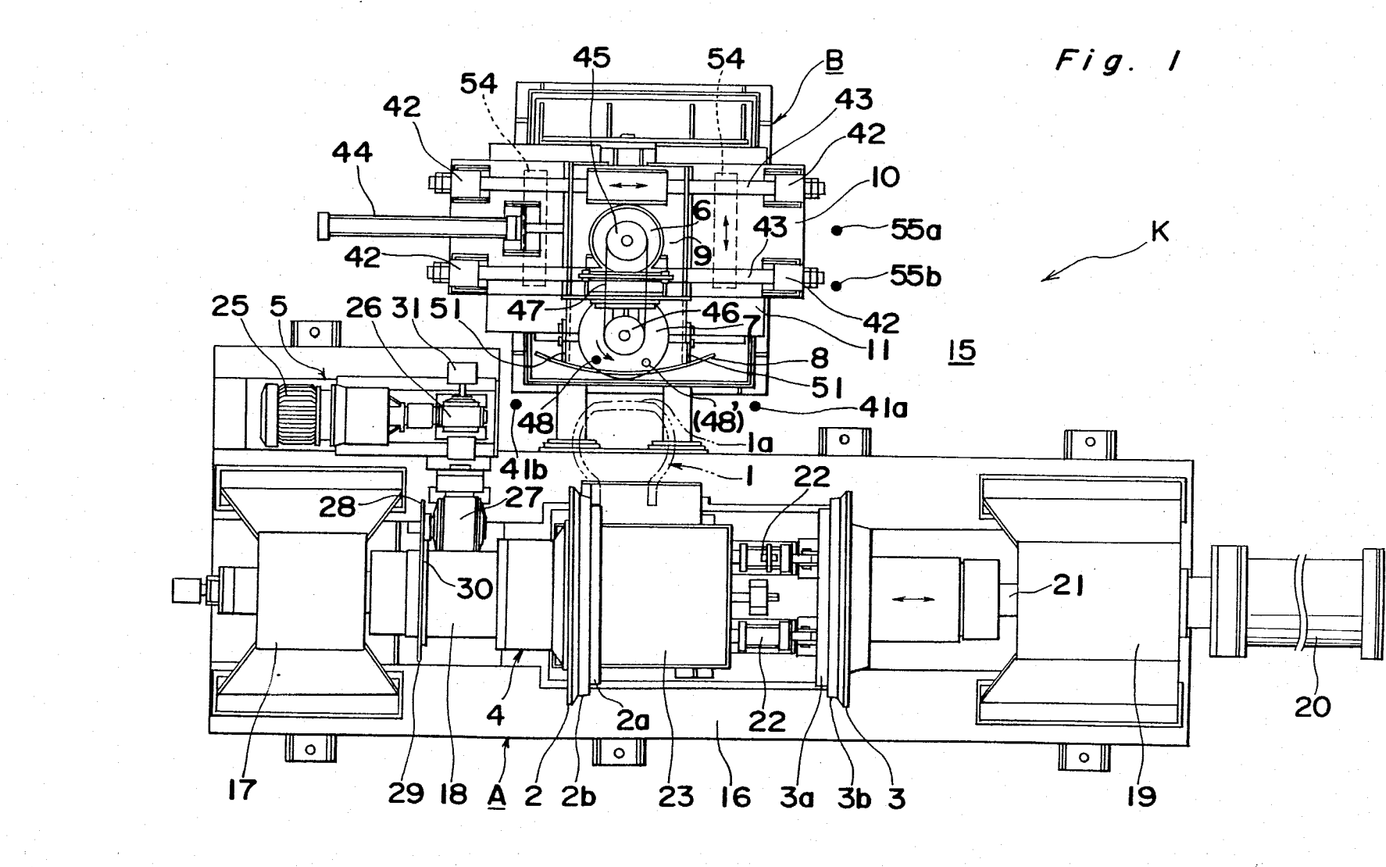
FIG. 1 is a top plan view of an automatic sipe forming machine according to the present invention.
Figure 2:
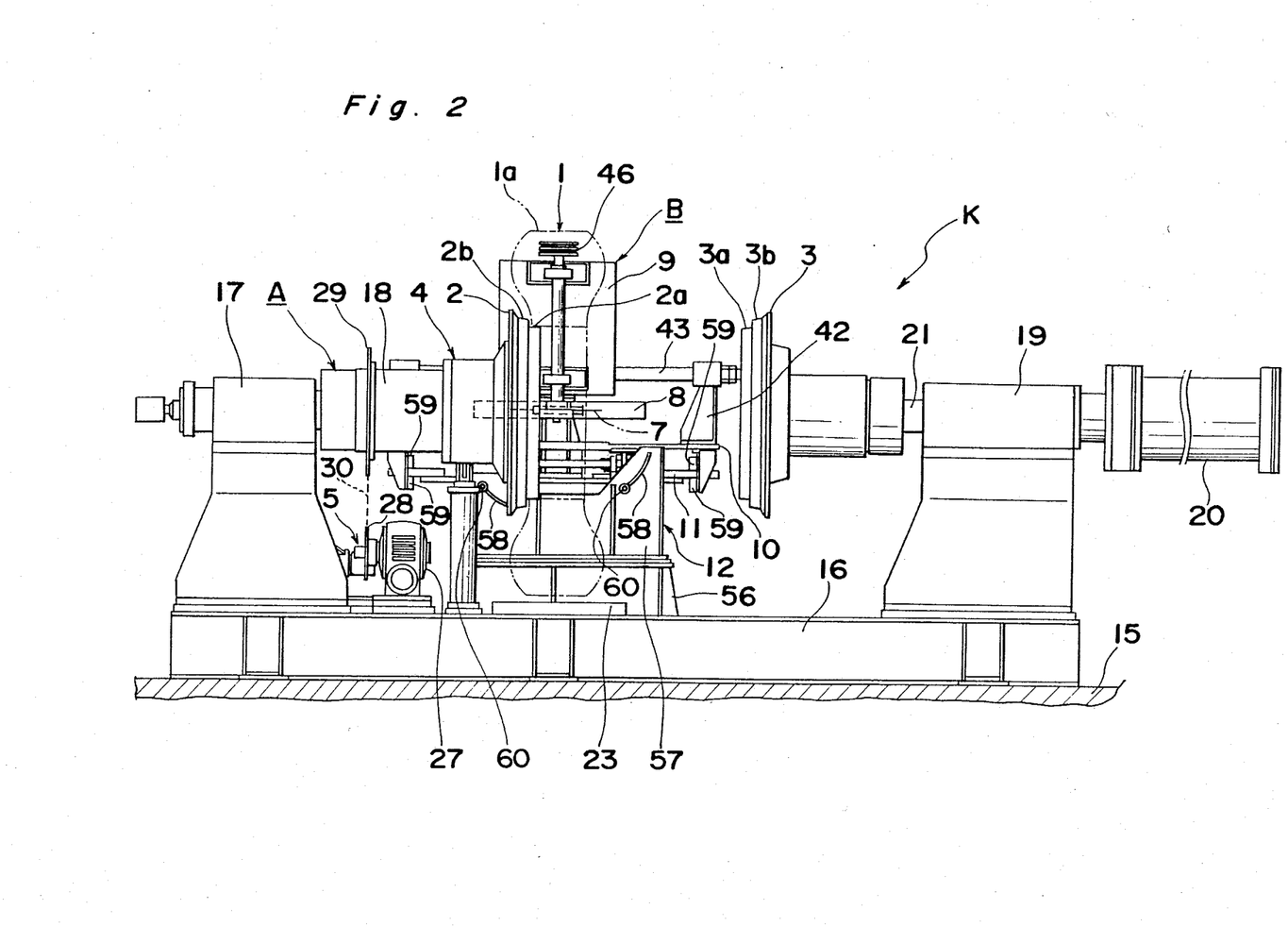
FIG. 2 is a side elevational view of the automatic sipe forming machine of FIG. 1.

Referring now to the drawings, there is seen in FIGS. 1 and 2, an automatic sipe forming machine K according to one preferred embodiment of the present invention. The automatic sipe forming machine K generally includes a tire supporting apparatus A, a sipe forming apparatus B and a base 16 installed on a floor 15. The tire supporting apparatus A includes a tire bearing mechanism 4 provided with a pair of rims, a first rim 2 and a second rim 3. A tire 1 is rotatably and vertically supported by the first rim 2 and the second rim 3. The tire supporting apparatus A further includes an intermittent rotary mechanism 5 for intermittently rotating the tire 1 at intervals of a predetermined angle.

Meanwhile, the sipe forming apparatus B includes a disc cutter 7 rotated by a motor 6, an arcuate sliding beam 8 arranged to follow a curvature of a tread face 1a of the tire 1 for regulating a depth of sipes to be formed by the disc cutter 7, a cutter holder 9 for supporting the disc cutter 7 and the sliding beam 8, a carriage 10 for reciprocatingly guiding the cutter holder 9 in a sipe forming direction, i.e., rightwards and leftwards, a guide rail 11 for reciprocatingly guiding the carriage 10 in a direction orthogonal to the sipe forming direction, i.e., forwards and rearwards or in a longitudinal direction, and an angle changing mechanism 12 arranged to adjustably secure the guide rail 11 at an appropriate angle for changing a sipe forming angle of the disc cutter 7.

In the tire bearing mechanism 4 of the tire supporting apparatus A, a driving shaft 18 having the first rim 2 secured thereto is rotatably supported by a first support stand 17 mounted on a left end portion of the base 16, while the second rim 3 is reciprocatingly and freely rotatably supported by a piston rod 21 of a cylinder 20 secured to a second support stand 19 which is mounted on a right end portion of the base 16. Meanwhile, the first rim 2 and the second rim 3 have small diameter bead seat portions 2a and 3a for tube tires and the like and large diameter bead seat portions 2b and 3b for tubeless tires, and the like respectively.

Furthermore, there is provided on the base 16 a lifter 23 which is arranged to be driven upwardly and downwardly by cylinders 22 and link members (not shown) so as to be operatively associated with the first rim 2 for positioning the tire 1. It is so arranged that, when the lowered lifter 23 having the tire 1 loaded ventures thereon is elevated by actuating a foot-operated valve, etc., an axis of the tire 1 is brought into alignment with the axes of the first rim 2 and the second rim 3. Accordingly, subsequently upon leftward movement of the second rim 3 by the cylinder 20, bead portions of the tire 1 are fitted around the first rim 2 and the second rim 3 such that the tire 1 is supported by the first rim 2 and the second rim 3.

Figure 3:
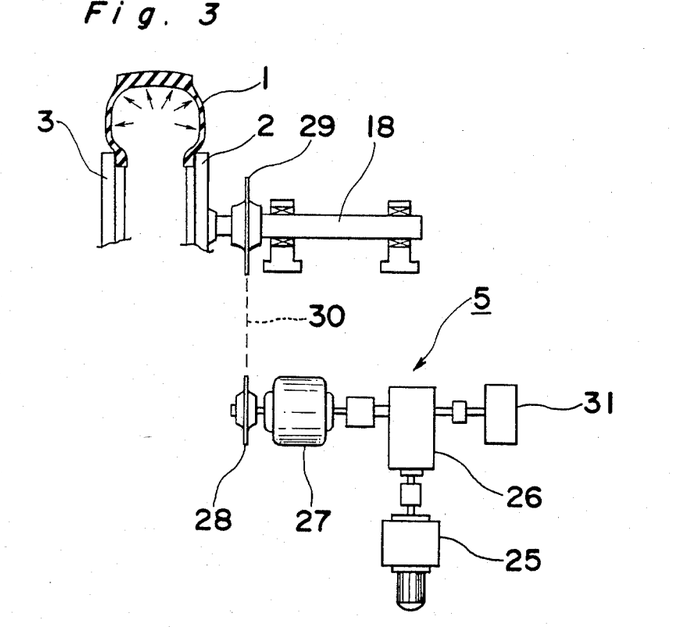
FIG. 3 is a schematic view of an intermittent rotary mechanism of a pulse counting type employed in the automatic sipe forming machine of FIG. 1.

As shown in FIG. 3, the intermittent rotary mechanism 5 of the tire supporting apparatus A is of a pulse counting type and includes a motor 25 equipped with a clutch brake, a first speed reducer 26, a second speed reducer 27, a pulley 28 coupled to the second speed reducer 27, a pulley 29 mounted on the driving shaft 18 of the tire bearing mechanism 4, a chain 30 trained over the pulleys 28 and 29, and a pulse counter 31 provided on the first speed reducer 26, with the first speed reducer 26 and the second speed reducer 27 being coupled to the motor 25.

Figure 4:
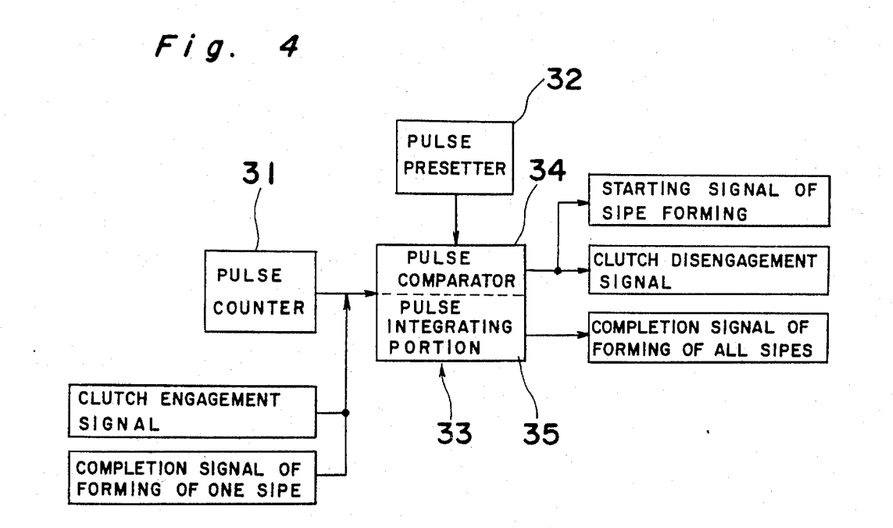
FIG. 4 is a block diagram explanatory of control of the intermittent rotary mechanism of FIG. 3.

Hereinbelow, control actions of the intermittent rotary mechanism 5 of the pulse counting type will be described with reference to a block diagram of FIG. 4.

Supposing that, by setting the number of pulses at, for example, 1,000 by the use of a pulse presetter 32, reduction ratios of the first speed reducer 26 and the second speed reducer 27 are so set as to effect 1/360 (1 degree) of one rotation of the driving shaft 18 when the first speed reducer 26 has completed 1,000 rotations, the number of rotations of the first speed reducer 26, i.e., the number of pulses is counted by the pulse counter 31. Then, the number of pulses is compared with a set value of pulses of the pulse presetter 32 by a pulse comparator 34 of a control circuit 33 such that the driving shaft 18 is temporarily stopped at intervals of 1,000 pulses through disengagement of the clutch of the motor 25 and actuation of the brake of the motor 25. Thus, a sipe pitch is set at 1 degree, while pulses are integrated by a pulse integrating portion 35 of the control circuit 33. When 360,000 pulses have been integrated by the pulse integrating portion 35, the driving shaft 18 is brought to a stop completely after one full rotation through disengagement of the clutch of the motor 25 and actuation of the brake of the motor 25, whereby one cycle of the sipe forming operation of the automatic sipe forming machine K is completed. As described above, in the case where the tire 1 is divided into 360 equal parts, 1,000 pulses are counted for the sipe pitch of 1 degree. Meanwhile, in the case where the tire 1 is divided into 120 and 300 equal parts, 1,200 and 3,000 pulses are counted for sipe pitches of 1.2 and 3 degrees, respectively.

Figure 5:
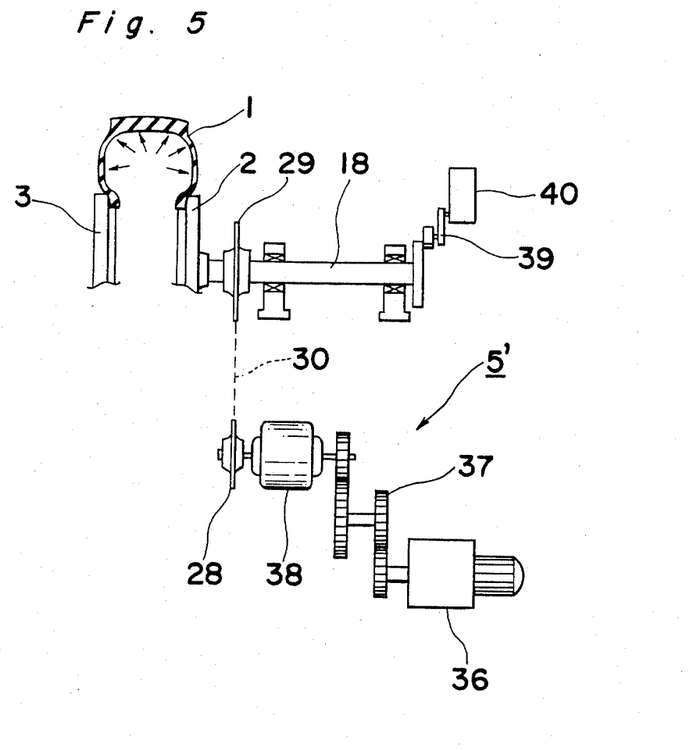
FIG. 5 is a view similar to FIG. 3, particularly showing a modification thereof, i.e., an intermittent rotary mechanism of a change gear type.

Meanwhile, the intermittent rotary mechanism 5 of the pulse counting type may be replaced by an intermittent rotary mechanism 5' of a change gear type shown in FIG. 5. The intermittent rotary mechanism 5' of the change gear type includes a motor 36, change gears 37, a speed reducer 38, a contact piece 39 attached to the driving shaft 18, and a limit switch 40 such that the change gears 37 and the speed reducer 38 are coupled to the motor 36. Thus, in the same manner as the motor 25 of the intermittent rotary mechanism 5, the motor 36 is coupled, through the pulley 28, the chain 30 and the pulley 29, to the driving shaft 18. It is to be noted here that the motor 36 is arranged to effect a fixed number of rotations upon a starting signal so as to intermittently rotate the driving shaft 18. In order to change sipe pitches in the intermittent rotary mechanism 5', a gear ratio of the change gears 37 is required to be changed. Furthermore, it is so arranged that one rotation of the driving shaft 18 is detected through actuation of the limit switch 40 upon pressing contact of the contact piece 39 with the limit switch 40.

Referring back to FIGS. 1 and 2, the cutter holder 9 is reciprocatingly guided in the sipe forming direction, i.e., rightwards and leftwards by a pair of guide rods 43 each supported by a pair of brackets 42 mounted on the carriage 10 and is reciprocatingly driven by a cylinder 44 secured to the carriage 10. A travelling stroke of the reciprocation of the cutter holder 9 is regulated by a pair of limit switches 41a and 41b. The disc cutter 7 is disposed at a front portion of the cutter holder 9 and is coupled, through a pulley 46, a belt 47 and a pulley 45, to the motor 6 so as to be rotated at a high speed by the motor 6 in a horizontal plane including the axis of the tire 1 as shown in FIG. 2 or in a plane inclined at an appropriate angle with respect to the horizontal plane. In another embodiment, the disc cutter 7 is rotated in a first plane including the axis of the tire 1 or in a second plane inclined at an appropriate angle with respect to the first plane. A spray nozzle 48 which is disposed forward of the disc cutter 7 is arranged to spray water to portions subjected to sipe forming so as to prevent emission of smoke therefrom and to cool the disc cutter 7.

Figure 6:
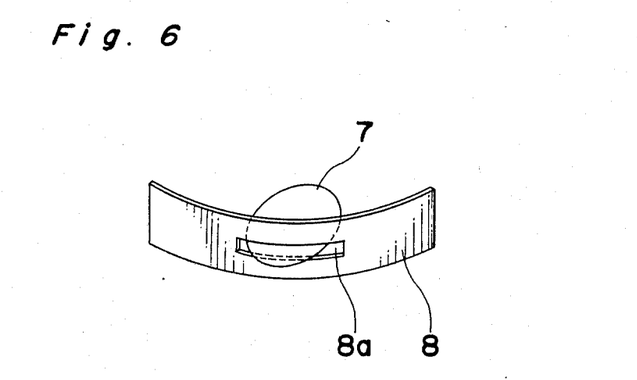
FIG. 6 is a perspective view of a sliding beam and a disc cutter employed in the automatic sipe forming machine of FIG. 1.

As shown in FIG. 6, the arcuate sliding beam 8 disposed forward of the cutter holder 9 is supported by a pair of brackets 51 so as to project a portion of the disc cutter 7 out of a central opening 8a of the sliding beam 8 and the projection amount is adapted to correspond to a maximum sipe depth.

Figure 7:
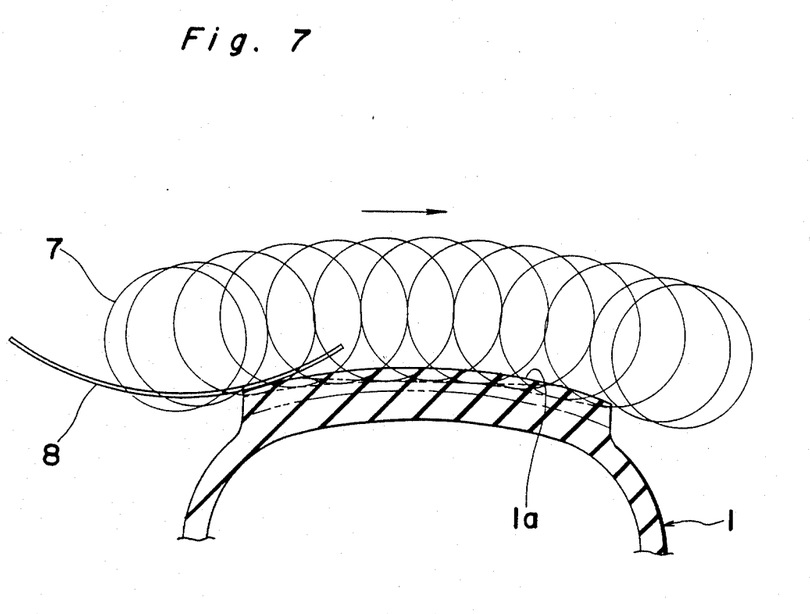
FIG. 7 is a view explanatory of forming of sipes effected by the sliding beam and the disc cutter of FIG. 6.

As shown in FIG. 7, the sliding beam 8 is arranged to follow a curvature of the tread face 1a of the tire 1. Accordingly, when the disc cutter 7 is delicately moved together with the cutter holder 9, the sipe depth is regulated by the sliding beam 8 so as to assume the maximum value at a central portion of the tread face 1a and a small value at opposite shoulder portions of the tire 1 as shown in broken lines. Meanwhile, when a curvature of the sliding beam 8 is set at a small value, namely, the sliding beam 8 is so formed as to approximate a rectilinear shape, the sipes are formed as shown in one-dot chain lines. To the contrary, when the curvature of the sliding beam 8 is set at a large value, namely, the curvature of the sliding beam 8 is so determined as to approximate that of the disc cutter 7, the sipes are formed as shown in two-dot chain lines.

Furthermore, since the guide rail 11 supported by the angle changing mechanism 12 is interposed between rollers 59 disposed below the carriage 10 of the sipe forming apparatus B, the carriage 10 is reciprocatingly driven in the direction orthogonal to the sipe forming direction (rightwards and leftwards), i.e., forwards and rearwards or in the longitudinal direction by a pair of cylinders 54 secured to the guide rail 11. A travelling stroke of the reciprocation of the carriage 10 is regulated by a pair of limit switches 55a and 55b. The cylinders 54 are operated at low pressures of 1 to 2 kg/cm$^2$. It is so arranged that, when the sliding beam 8 has followed the curvature of the tread face 1a of the tire 1 and the carriage 10 is subjected to a rearward force through the cutter holder 9, the rearward force surpasses an operating force of the cylinders 54 such that the carriage 10 is moved lightly or slightly rearwards.

The angle changing mechanism 12 of the sipe forming apparatus B includes a base frame 56 mounted on the base 16, and a pair of brackets 57 which are provided forward the and rearwards of the base frame 56, respectively. Each of the brackets 57 is formed with a pair of graduated arcuate elongated openings 58 having a circular center disposed in alignment with the center of the tire 1. Thus, the guide rail 11 is adjustably secured at an appropriate angle by tightening bolts 60, etc. inserted into the elongated openings 58, whereby angles (sipe forming angles) of the disc cutter 7 can be changed in the range of 0 to 40 degrees with respect to the plane including the axis of the tire 1. FIG. 2 shows, as an example, that the disc cutter 7 is located at an angle of zero degree with respect to the plane including the axis of the tire 1. From this, it follows that the guide rail 11 is adjustably secured at an appropriate angle with respect to the axis of the tire 1. FIG. 2 shows, as an example, that the guide rail 11 is secured at an angle of zero degree with respect to the axis of the tire 1.

By the above described arrangement of the tire supporting apparatus A and the sipe forming apparatus B, at the initial stage, the carriage 10 is disposed at a retracted position by the cylinders 54 and the cutter holder 9 is disposed at a right stand-by position (projected position of a piston rod of the cylinder 44) by the cylinder 44. The tire 1 is vertically loaded onto the lifter 23 and then, the lifter 23 is elevated. Subsequently, the tire 1 is fitted around the first rim 2 and the second rim 3 upon leftward movement of the rim 3 by the cylinder 20 so as to be supported by the first rim 2 and the second rim 3. Thereafter, air is supplied into the tire 1 such that the tire 1 is subjected to an internal pressure and inflated.

Subsequently, when the carriage 10 is forwardly driven by the cylinders 54 and the cutter holder 9 is driven leftwards by the cylinder 44, the sliding beam 8 is caused to follow the curvature of the tread face 1a of the tire 1 so as to delicately move the disc cutter 7 forwards and rearwards, whereby sipes are formed on the tread face 1a so as to have a large depth at the central portion of the tread face 1a and a small depth at the opposite shoulder portions.

When the cutter holder 9 has been moved leftwards to its left stroke limit (retracted position of the piston rod of the cylinder 44), the carriage 10 is moved rearwards to the retracted position by the cylinders 54, while the cutter holder 9 is driven rightwards to the right stand-by position by the cylinder 44 so as to be brought to a stop thereat. At this time, the tire 1 is intermittently rotated through the predetermined angle and then, the carriage 10 is forwardly driven by the cylinders 54 so as to repeat the above described cycle of the sipe forming operation of the automatic sipe forming machine K. When the tire 1 has completed one rotation, intermittent rotation of the tire 1 effected by the intermittent rotary mechanism 5 is stopped. Subsequently, the second rim 3 is retracted rightwards by the cylinder 20 and the tire 1 is removed from the first rim 2 and taken out. Thereafter, another tire 1 is loaded vertically onto the lifter 23 as described above.

Although one disc cutter 7 is employed in the automatic sipe forming machine K of the above described embodiment, it can be also so arranged that two disc cutters are provided so as to interpose therebetween a spacer having a thickness corresponding to the sipe pitch. In this case, the sipe forming operation can be performed twice as rapidly as the arrangement employing one disc cutter.

Meanwhile, it is desirable that the disc cutter 7 be rotated in a cutting direction. Namely, when the disc cutter 7 is moved leftwards to form sipes on the tread face 1a, the disc cutter 7 is rotated in the counterclockwise direction as shown in FIG. 1. Meanwhile, when the disc cutter 7 is moved rightwards to form sipes on the tread face 1a, the disc cutter 7 is rotated in the clockwise direction. Moreover, it can be also so arranged, in the above mentioned embodiment where the disc cutter 7 is moved leftwards to form sipes, that during the rightward movement of the disc cutter 7 the next sipe is formed. Namely, sipes can be formed during both the leftward and rightward movements of the disc cutter 7 by reversely rotating the disc cutter 7 in the counterclockwise and clockwise directions, respectively. In this case, a spray nozzle 48' is required to be provided in addition to the spray nozzle 48 so as to be disposed near the disc cutter 7 such that the spray nozzles 48 and 48' confront each other.

As is clear from the foregoing description, in accordance with the present invention, the new tire or the retreaded tire is supported by the tire supporting apparatus so as to be rotated intermittently, while the curvature of the tread face of the tire is followed by the sliding beam of the sipe forming apparatus such that the sipes are directly formed on the tread face of the new tire or the retreaded tire by the disc cutter of the sipe forming apparatus.

Meanwhile, in accordance with the present invention, it is now possible to easily adjust the pitch of the sipes by the intermittent rotary mechanism, the depths and the shapes of the sipes by the sliding beam and the disc cutter, and the angles of the sipes by the angle changing mechanism.

Furthermore, in accordance with the present invention, since it has been structurally arranged that the tire supporting mechanism, the intermittent rotary mechanism, the cutter holder provided with the disc cutter and the sliding beam, the carriage, the guide member, and the angle changing mechanism for changing the sipe forming angles are driven by the motors or the cylinders, the automatic sipe forming machine has been made simple in structure, reliable in actual use and low in production cost.

Although the present invention has been fully described by way of example with reference to the accompanying drawings, it is to be noted here that various changes and modifications will be apparent to those skilled in the art. Therefore, unless such changes and modifications depart from the scope of the present invention, they should be construed as included therein.

What is claimed is:

1. An automatic sipe forming machine for forming sipes at a predetermined depth on a circumferential tread face of a tire having a defined curvature comprising:
    a tire support apparatus; and
    a sipe forming apparatus;
    said tire support apparatus comprising
        a tire bearing mechanism including a pair of first and second rims said tire being rotatably supported by said first and second rim; and
        an intermittent rotary mechanism for intermittently rotating said tire at intervals at a predetermined angle;
    said sipe forming apparatus comprising
        at least one disc cutter for forming said sipes on said tread face of said tire, which is rotated by a motor in a plane including an axis of said tire;
        a sliding beam having a curvature arranged to follow said curvature of said circumferential tread face of said tire so as to regulate the depth of said sipes formed by said disc cutter such that said depth of said sipes becomes smaller at shoulder portions of said tire tread than at a central portion of said tire tread in accordance with the curvature of said sliding beam;
        a cutter holder for supporting said disc cutter and said sliding beam;
        a carriage for reciprocatingly guiding said cutter holder in a left and right direction; and
        a guide member for reciprocatingly guiding said carriage in a forward and rearward direction.

2. An automatic sipe forming machine for forming sipes at a predetermined depth on a circumferential tread face of a tire having a defined curvature comprising:
    a tire support apparatus; and
    a sipe forming apparatus;
    said tire support apparatus comprising
        a tire bearing mechanism including a pair of first and second rims said tire being rotatably supported by said first and second rims; and
        an intermittent rotary mechanism for intermittently rotating said tire at intervals at a predetermined angle;
    said sipe forming apparatus comprising
        at least one disc cutter for forming said sipes on said tread face of said tire, which is rotated by a motor in a first plane including an axis of said tire or in a second plane inclined at an appropriate angle with respect to said first plane;
        a sliding beam having a curvature arranged to follow said curvature of said circumferential face of said tire so as to regulate the depth of said sipes formed by said disc cutter such that said depth of said sipes becomes smaller at shoulder portions of said tire tread than at a central portion of said tire tread in accordance with the curvature of said sliding beam;
        a cutter holder for supporting said disc cutter and sliding beam;
        a carriage for reciprocatingly guiding said cutter holder in a left and right direction;
        a guide member for reciprotatingly guiding said carriage in a forward and rearward direction; and
        an angle changing mechanism arranged to adjustably secure said guide member at an appropriate angle with respect to said axis of said tire so as to change a sipe forming angle of said disc cutter.

3. An automatic sipe forming machine as in claim 1, wherein said intermittent rotary mechanism is a pulse counting type intermittent rotary mechanism,
    said pulse counting type intermittent rotary mechanism including a pulse counter and a first motor equipped with a clutch brake.

4. An automatic sipe forming machine as in claim 2, wherein said intermittent rotary mechanism is a pulse counting type intermittent rotary mechanism,
    said pulse counting type intermittent rotary mechanism including a pulse counter and a first motor equipped with a clutch brake.

5. An automatic sipe forming machine as in claim 1, wherein said intermittent rotary mechanism is a change gear type intermittent rotary mechanism,
    said change gear type intermittent rotary mechanism including change gears and a second motor arranged to effect a fixed number of rotations upon a starting signal.

6. An automatic sipe forming machine as in claim 2, wherein said intermittent rotary mechanism is a change gear type intermittent rotary mechanism,
    said change gear type intermittent rotary mechanism including change gears and a second motor arranged to effect a fixed number of rotations upon a starting signal.

7. An automatic sipe forming machine as in claim 1, wherein said sipe forming apparatus further includes:
    a first cylinder for reciprocatingly driving said cutter holder in said left and right directions, which is mounted on said carriage; and
    a second cylinder for reciprocatingly driving said carriage in said forward and rearward directions, which is mounted on said guide member.

8. An automatic sipe forming machine as in claim 2, wherein said sipe forming apparatus further includes:
    a first cylinder for reciprocatingly driving said cutter holder in said left and right directions, which is mounted on said carriage; and
    a second cylinder for reciprocatingly driving said carriage in said forward and rearward directions, which is mounted on said guide member.

9. An automatic sipe forming machine as in claim 3, wherein said sipe forming apparatus further includes:
- a first cylinder for reciprocatingly driving said cutter holder in said left and right directions, which is mounted on said carriage; and
- a second cylinder for reciprocatingly driving said carriage in said forward and rearward directions, which is mounted on said guide member.

10. An automatic sipe forming machine as in claim 4, wherein said sipe forming apparatus further includes:
- a first cylinder for reciprocatingly driving said cutter holder in said left and right directions, which is mounted on said carriage; and
- a second cylinder for reciprocatingly driving said carriage in said forward and rearward directions, which is mounted on said guide member.

11. An automatic sipe forming machine as in claim 5, wherein said sipe forming apparatus further includes:
- a first cylinder for reciprocatingly driving said cutter holder in said left and right directions, which is mounted on said carriage; and
- a second cylinder for reciprocatingly driving said carriage in said forward and rearward directions, which is mounted on said guide member.

12. An automatic sipe forming machine as in claim 6, wherein said sipe forming apparatus further includes:
- a first cylinder for reciprocatingly driving said cutter holder in said left and right directions, which is mounted on said carriage; and
- a second cylinder for reciprocatingly driving said carriage in said forward and rearward directions, which is mounted on said guide member.

* * * * *